(12) United States Patent
Ikeda

(10) Patent No.: US 6,813,671 B1
(45) Date of Patent: Nov. 2, 2004

(54) CONTROLLER FOR HOT SWAPPING OF EXTENDED I/O DEVICE TO COMPUTER BODY

(75) Inventor: Takashi Ikeda, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/345,493

(22) Filed: Jul. 1, 1999

(30) Foreign Application Priority Data

Jul. 2, 1998 (JP) .......................................... 10-187095

(51) Int. Cl.[7] .............................................. G06F 13/00
(52) U.S. Cl. ........................................ 710/303; 710/2
(58) Field of Search ................................ 710/103, 104, 710/9, 302, 3, 16, 300, 129, 100, 2, 303; 711/112, 147; 307/64; 361/686; 700/16; 713/300

(56) References Cited

U.S. PATENT DOCUMENTS

| | | | | |
|---|---|---|---|---|
| 5,805,412 A | * | 9/1998 | Yanagisawa et al. | 361/686 |
| 5,822,547 A | * | 10/1998 | Boesch et al. | 710/302 |
| 5,886,424 A | * | 3/1999 | Kim | 307/64 |
| 5,991,839 A | * | 11/1999 | Ninomiya | 710/303 |
| 5,999,997 A | * | 12/1999 | Pipes | 710/303 |
| 6,038,624 A | * | 3/2000 | Chan et al. | 710/103 |
| 6,088,517 A | * | 7/2000 | Wanner et al. | 700/16 |
| 6,088,620 A | * | 7/2000 | Ninomiya et al. | 700/16 |
| 6,092,135 A | * | 7/2000 | Kwon | 710/104 |
| 6,094,700 A | * | 7/2000 | Deschepper et al. | 710/129 |
| 6,141,711 A | * | 10/2000 | Shah et al. | 710/103 |
| 6,148,353 A | * | 11/2000 | Cho | 710/303 |
| 6,178,469 B1 | * | 1/2001 | Hennessy et al. | 710/9 |
| 6,209,042 B1 | * | 3/2001 | Yanagisawa et al. | 710/3 |
| 6,247,079 B1 | * | 6/2001 | Papa et al. | 710/103 |
| 6,256,691 B1 | * | 7/2001 | Moroz et al. | 710/303 |
| 6,269,417 B1 | * | 7/2001 | Mahalingam | 710/104 |
| 6,304,929 B1 | * | 10/2001 | Wallach et al. | 710/103 |
| 6,397,339 B1 | * | 5/2002 | Terazawa | 713/300 |

FOREIGN PATENT DOCUMENTS

JP 9-097126 4/1997

* cited by examiner

*Primary Examiner*—John Follansbee
*Assistant Examiner*—Jungwon Chang
(74) *Attorney, Agent, or Firm*—Foley & Lardner LLP (57) ABSTRACT

In a controller for hot swapping of an extended input-output (I/O) device to a computer body, a first I/O controller is provided in the computer body, and a second I/O controller is provided in the extended I/O device. Register information of the first I/O controller is copied through a system bus onto a corresponding address of a register in the second I/O controller. By virtue of this construction, the controller for hot swapping of the invention can reduce the number of signals required at the time of connection of the computer body to the extended I/O device and can realize hot swapping without relying upon any software.

9 Claims, 6 Drawing Sheets

CONTROLLER FOR HOT SWAPPING OF EXTENDED I/O DEVICE TO COMPUTER BODY

FIELD OF THE INVENTION

The invention relates to a controller for hot swapping of an extended I/O (input-output) device to a computer body, and more particularly to a controller for hot swapping which can realize connection of an extended I/O device to a computer body without relying upon any software when the computer body is in operation.

BACKGROUND OF THE INVENTION

In conventional small-sized portable computers, there are computer systems that, for reasons of the restriction of space for mounting on the body side, small frequency of use and the like, use extended I/O devices, called "port bars" or "docking stations," for connecting I/O ports, such as serial ports and parallel ports, floppy disk drive units and the like.

Conventional controllers for hot swapping of an extended I/O device to a computer body are disclosed, for example, in Japanese Patent Laid-Open No. 9712,/1997. This computer system has an extended I/O device, such as a docking station or a card dock, that is detachably mounted on the computer body. The extended I/O device is connected to the computer body through a docking connector. An I/O controller contained in the computer body detects docking and controls the extended I/O device.

This conventional controller for hot swapping of an extended I/O device to a computer body will be explained in more detail.

The conventional controller for hot swapping comprises a computer body and an extended I/O device. The computer body comprises: an I/O controller for controlling various I/O units and ports; a connector connected to the I/O controller through a plurality of data lines; a system controller connected to the I/O controller through a system bus; and CPU connected to the system controller through a CPU bus, for executing softwares. The extended I/O device comprises: a connector; a hard disk drive unit, a floppy disk drive unit, and output ports connected to the connector; a data line for connecting the hard disk drive unit to the extension connector; a data line for connecting the floppy disk drive unit to the extension connector; and data lines for connecting I/O ports to the extension connector.

According to the conventional controller for hot swapping of an extended I/O device to the computer body, as soon as the connection of the connector in the computer body to the connector in the extended I/O device is confirmed a connection signal is output from the I/O controller to the extended I/O device. Based on the input of the connection signal, the hard disk drive unit, the floppy disk drive unit, and the I/O ports are controlled, thus permitting the hard disk drive unit, the floppy disk drive unit, and the I/O ports to be used as extended devices for the computer body.

Another conventional controller for hot swapping of an extended I/O device to a computer body will be explained. This conventional controller for hot swapping include an I/O controller provided in an extended I/O device, and connectors for connecting a system bus in a computer body to the I/O controller. The other construction is the same as that described in the above computer system. According to this computer system, the connector in the computer body is connected to the connector in the extended I/O device to connect the I/O controller provided in the extended I/O device to the system bus in the computer body.

According to the conventional controllers for hot swapping of an extended I/O device to a computer body, the provision of the I/O controller in the computer body necessitates a large number of signals for the connection of the extended I/O device to the computer body, leading to an increase in the number pins for the connectors and an increased size of the connectors and, in its turn, an increased size of the computer body. On the other hand, the provision of the I/O controller in the extended I/O device necessitates a special software having initialization data for the I/O controller in order to enable hot swapping. This limits the kind of softwares that can use the extended I/O device.

SUMMARY OF THE INVENTION

Accordingly, it is an object of the invention to provide a controller for hot swapping of an extended I/O device to a computer body that can reduce the number of signals required at the time of connection of the computer body to the extended I/O device and can realize hot swapping without relying upon any special software.

According to the first feature of the invention, an apparatus comprises: a computer body including a processing unit and a first I/O (input-output) controller having a first register for containing predetermined data in a predetermined address; and an extended I/O device which is hot swappable to the computer body and comprises a second I/O controller having a second register, said second register having an address corresponding to the predetermined address of the first register, said apparatus further comprising control means for detecting, upon providing power to the computer body, connection of the I/O device to the computer body, and for controlling the initialization of the first and second I/O controllers based on the detection results.

Preferably, when the detection results indicate that the extended I/O device is not connected to the computer body, upon providing power to the computer body, the first I/O controller is initialized; and, after initialization of the first I/O controller, upon connection of the extended I/O device to the computer body, said control means copies initialization data in the set register in the first I/O controller into the register in the second I/O controller. On the other hand, preferably, when the detection results indicate that the extended I/O device is already in connection to the computer body upon providing power to the computer body, said control means initializes the register in the second I/O controller instead of the set register in the first I/O controller. Preferably, the address of the register in the second I/O controller is identical to the predetermined address of the set register in the first I/O controller. The control means may receive a swapping signal from a connector for connecting the extended I/O device to the computer body. A system controller may be included in the computer body. Preferably, upon connection of the extended I/O device to the computer body, the control means instead of the system controller controls the first and second I/O controllers.

BRIEF DESCRIPTION OF THE DRAWING

The invention will be explained in more detail in conjunction with the appended drawings, wherein.

DESCRIPTION OF THE PREFERRED EMBODIMENTS

Before describing the controller for hot swapping of an extended I/O device to a computer body according to preferred embodiment of the invention, the conventional controllers for hot swapping of an extended I/O device to a computer body will be explained in FIGS. 1 and 2.

Figure 1:
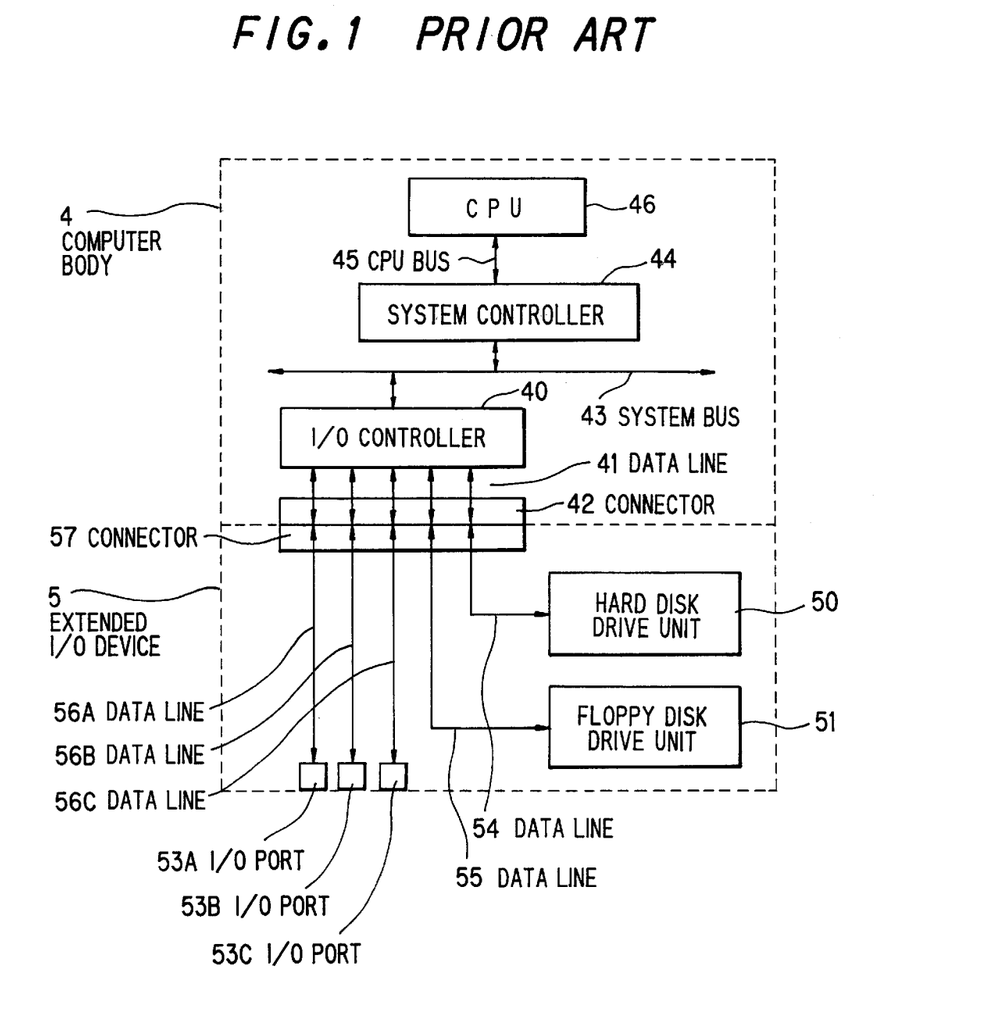
FIG. 1 is a diagram illustrating a conventional controller for hot swapping of an extended I/O device to a computer body.

FIG. 1 is a schematic view of a conventional controller for hot swapping of an extended I/O device to a computer body. This conventional controller for hot swapping comprises a computer body 4 and an extended I/O device 5. The computer body 4 comprises: an I/O controller 40 for controlling various I/O units and ports; a connector 42 connected to the I/O controller 40 through a plurality of data lines 41; a system controller 44 connected to the I/O controller 40 through a system bus 43; and CPU 46 connected to the system controller 44 through a CPU bus 45, for executing softwares. The extended I/O device 5 comprises: a connector 57; a hard disk drive unit 50, a floppy disk drive unit 51, and output ports 53A, 53B, 53C connected to the connector 57; a data line 54 for connecting the hard disk drive unit 50 to the extension connector 57; a data line 55 for connecting the floppy disk drive unit 51 to the extension connector 57; and data lines 56A, 56B, 56C for connecting I/O ports 53A, 53B, 53C to the extension connector 57.

According to the controller for hot swapping of an extended I/O device to the computer body, as soon as the connection of the connector 42 in the computer body 4 to the connector 57 in the extended I/O device 5 is confirmed, a connection signal is output from the I/O controller 40 to the extended I/O device 5. Based on the input of the connection signal, the hard disk drive unit 50, the floppy disk drive unit 51, and the I/O ports 53A, 53B, 53C are controlled, thus permitting the hard disk drive unit, the floppy disc drive unit, and the I/O ports to be used as extended devices for the computer body.

Figure 2:
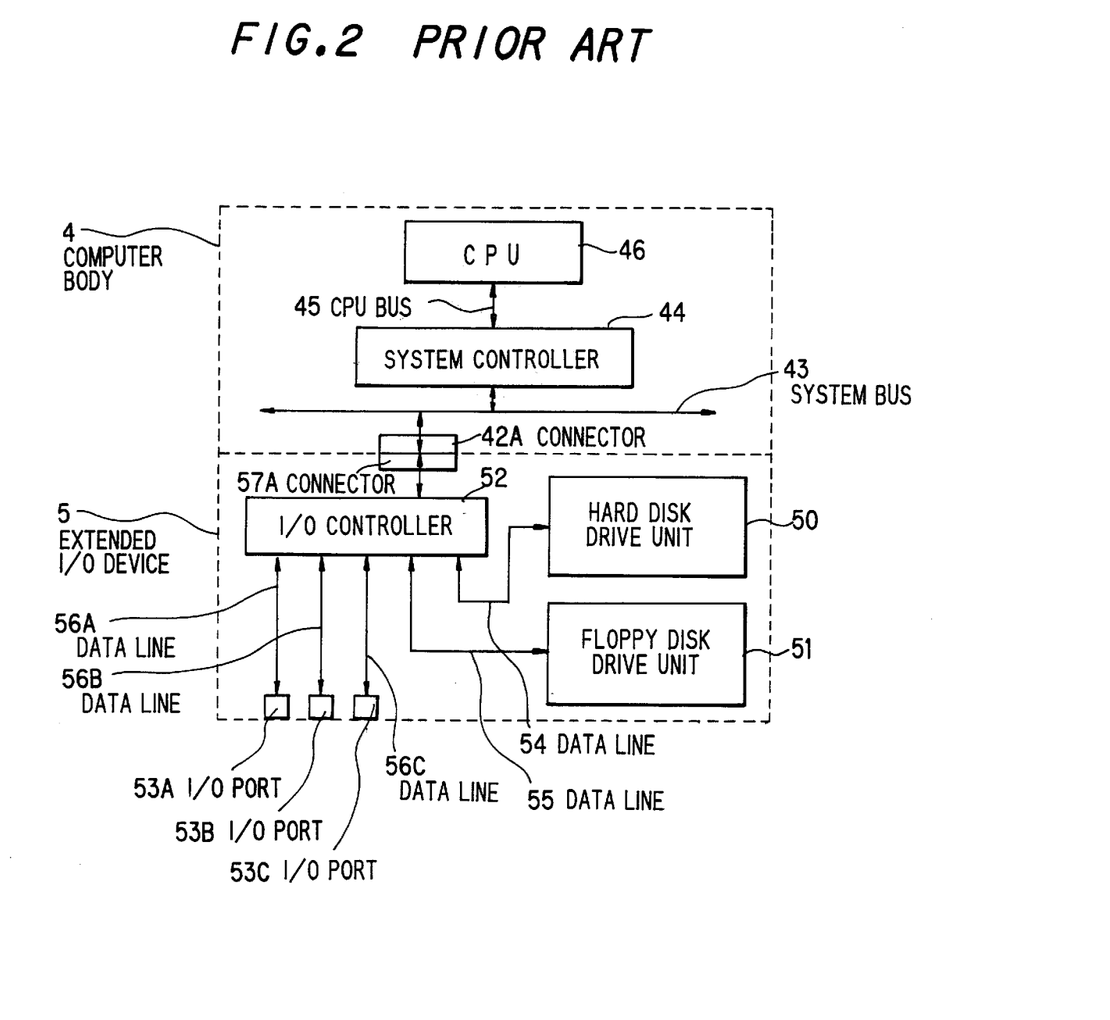
FIG. 2 is a diagram illustrating another conventional controller for hot swapping of an extended I/O device to a computer body.

FIG. 2 is another conventional controller for hot swapping of an extended I/O device to a computer body will be explained. This conventional controller for hot swapping include an I/O controller 52 provided in an extended I/O device 5, and connectors 42A, 57A for connecting a system bus 43 in a computer body 4 to the I/O controller 52. The other construction is the same as that described in the above computer system shown in FIG. 1. According to this conventional computer system, the connector 42A in the computer body 4 is connected to the connector 57A in the extended I/O device 5 to connect the I/O controller 52 provided in the extended I/O device 5 to the system bus 43 in the computer body.

According to the conventional controllers for hot swapping of an extended I/O device to a computer body, the provision of the I/O controller in the computer body necessitates a large number of signals for the connection of the extended I/O device to the computer body, leading to an increase in the number of pins for the connectors and an increased size of the connectors and, in its turn, an increased size of the computer body. On the other hand, the provision of the I/O controller in the extended I/O device necessitates a special software having initialization data for the I/O controller in order to enable hot swapping. This limits the kind of softwares that can use the extended I/O device.

Next, the controller for hot swapping of an extended I/O device to a computer body according to preferred embodiments of the invention will be explained in detail in FIGS. 3 to 6.

Figure 3:
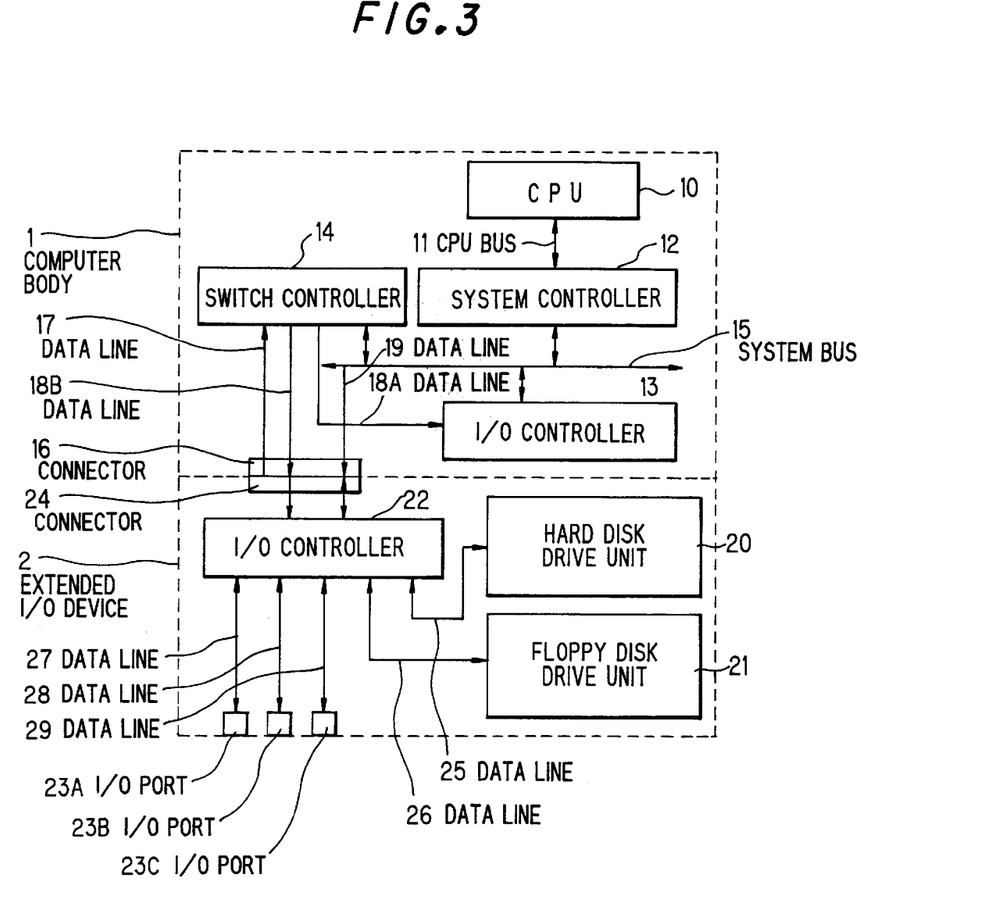
FIG. 3 is a diagram illustrating a first preferred embodiment of the controller for hot swapping of an extended I/O device to a computer body according to the invention.

FIG. 3 is a controller for hot swapping of an extended I/O device to a computer body according to the first preferred embodiment of the invention. The controller for hot swapping includes a connector 16 provided in a computer body 1 and a connector 24 provided in an extended I/O device 2 and connected to the connector 16.

The computer body 1 comprises: CPU 10 for executing the processing of a software (hereinafter referred to as "S/W"); a system controller 12 connected to CPU 10 through a CPU bus 11; an I/O controller 13 which has registers, such as a data transfer rate setting register and a communication type setting register, an I/O controller 13 for controlling various I/O units and ports; a switch controller 14 for switching I/O controllers provided respectively in the computer body 1 and the extended I/O device 2; a system bus 15 controlled by the system controller 12; and the connector 16 for connection to the extended I/O device 2.

CPU 10 outputs a command to the system controller 12 through the CPU bus 11. The system controller 12 controls CPU 10, and converts the command output from CPU 10 and outputs the converted command to the system bus 15. The I/O controller 13 is accessed in response to a corresponding address transferred to the system bus 15. The switch controller 14 receives from the connector 16 through a data line 17 a connection detaction signal indicating the connection of the computer body 1 to the extended I/O device 2, and outputs an access permission signal through a data line 18A to the I/O controller 13 on the computer body side and, in addition, outputs an access permission signal through a data line 18B to the I/O controller 22 on the extended I/O device side. As with the system controller 12 and the I/O controller 13, the switch controller 14 is connected to the system bus 15. To the connector 16 are connected a data line 17 for a connection detection signal, a data line 18B for an access permission signal sent to the I/O controller on the extended I/O device side, and a data line 19 for a system bus signal.

The extended I/O device 2 comprises: a hard disk drive unit 20; a floppy disk drive unit 21; an I/O controller 22 that has the same register in the same address as the register in the I/O controller 13, and controls various I/O units and ports; I/O ports 23A, 23B, 23C for connecting other devices to the extended I/O device 2; and a connector 24 for connection to the computer body 1.

The hard disk drive unit 20 is connected to the I/O controller 22 through a data line 25. The floppy disk drive unit 21 is connected to the I/O controller 22 through a data line 26. The I/O ports 23A, 23B, 23C are connected to the I/O controller 22 respectively through data lines 27, 28, and 29. The I/O controller 22 receives through the connector 24 an access permission signal and a system bus signal from the computer body 1.

Next, the operation of the controller for hot swapping of an extended I/O device to a computer body according to the first preferred embodiment of the invention will be explained.

At the outset, an explanation will be given on the case where, after the computer body 1 is activated in such state that the computer body 1 is not in connection to the extended I/O device 2, the computer body 1 is connected to the extended I/O device 2.

As soon as a power supply for the computer body 1 is put to work, CPU 10 outputs initialization data to the CPU bus 11, based on S/W programmed so as to initialize the system controller 12, the I/O controller 13, and the switch controller 14. The system controller 12 is initialized upon receipt of the initialization data through the CPU bus 11. On the other hand, the I/O controller 13 and the switch controller 14 are initialized upon receipt of the initialization data from the system bus 15 controlled by the system controller 12.

At the time of the initialization, CPU 10 reads the status of a connection detection signal through the switch controller 14 based on the processing of s/w. In this case, since the extended I/O device 2 is not connected to the computer body 1, the status is nonactive. Based on this information, CPU 10 controls the switch controller 14 to render the signal for permission of access to the I/O controller 13 active, while rendering the signal for permission of access to the I/O controller 22 nonactive, thus initializing the I/O controller 13. As a result of the above initialization, the computer body 1 is operable.

Next, upon connection of the connector 16 in the computer body 1 to the connector 24 in the extended I/O device 2, an active connection detection signal is input through the data line 17 into the switch controller 14. Consequently, the switch controller 14 detects the connection between the computer body 1 and the extended I/O device 2. In this case, instead of the system controller 12, the switch controller 14 temporarily controls the system bus 15 so that the whole register information in the I/O controller 13 are copied onto the I/O controller 22 on the extended I/O device 2 side.

Figure 4:
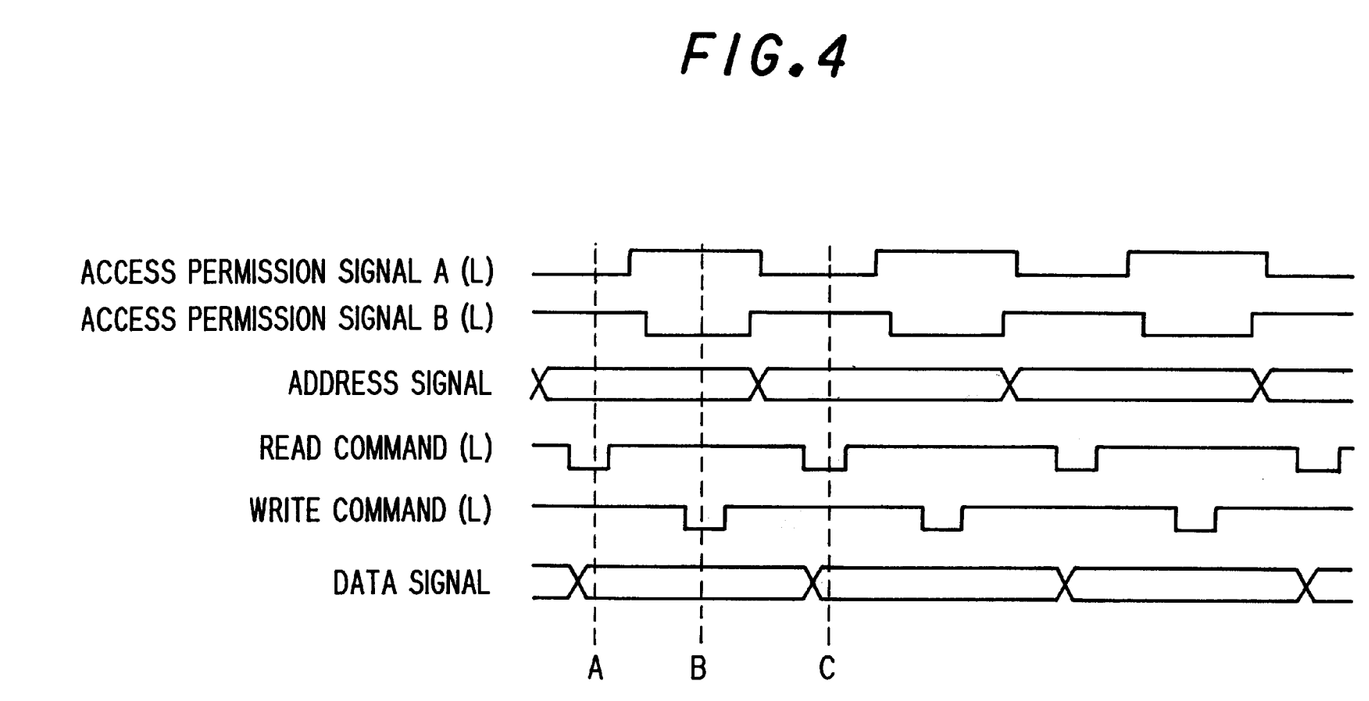
FIG. 4 is a timing chart showing the operation of the first preferred embodiment of the invention.

FIG. 4 shows a timing chart in the first preferred embodiment of the invention. An address signal, a read command, a write command, and a data signal are part of system bus signals constituting the system bus 15. In this timing chart, an access permission signal A represents the signal for permission of access to the I/O controller 13, and an access permission signal B represents the signal for permission of access to the I/O controller 22. A symbol (L) attached to the signal name indicates that the signal is active Low, that is, the Low level is active.

In the timing A, the access permission signal A is rendered active, while the access permission signal B is nonactive, thereby permitting access to the I/O controller 13. Upon output of a desired address allocated to the I/O controller to the address signal and the activation of the read command, the I/O controller 13 outputs register information stored in the address to the data signal.

In the timing B, the access permission signal B is rendered active to permit access to the I/O controller 22, while the access permission signal A is rendered nonactive. Upon output of the same address as that in the timing A is output to the address signal and the activation of the write command, the I/O controller 22 performs writing of the data signal output from the I/O controller 13. In this case, the same register information as that in the timing A is written in the I/O controller 22.

In the timing C, as with the timing A, the access permission signal A is rendered active, while the access permission signal B is rendered nonactive, thereby permitting access to the I/O controller 13. The timing C is the same as timing A, except that a next address is output to the address signal.

Thus, repetition of the operation in the timings A and B while varying the address signal in such a range as allocated to the I/O controller 13 permits the whole register information in the I/O controller 13 to be copied onto the I/O controller 22. Finally, a series of processings are terminated in such a state that the access permission signal A is rendered nonactive while the access permission signal B is rendered active.

When access to the I/O controller occurs in the system bus 15 before the completion of the above series of processings, the switch controller 14 renders the access permission signal A active wile rendering the access permission signal B nonactive, so that the I/O controller 13 responds to the access.

Upon the completion of the series of processing, the I/O controller 22 on the extended I/O device side rather than the I/O controller 13 on the computer body side responds to the access to the I/O controller sent from CPU 10 through the system controller 12 to the system bus 15. S/W recognizes the hard disk drive unit 20, the floppy disk drive unit 21, and the I/O ports 23A, 23B, and 23C as connected to the computer body 1, so that these I/O ports and drive units become usable.

Next, an explanation will be given on the case where a power supply for the computer body 1 is put to work in such a state that the computer body 1 is in connection to the extended I/O device 2.

In this case, the system controller 12, the I/O controller 13, and the switch controller 14 are initialized in the same manner as described above in connection with the case where the extended I/O device 2 is not in connection to the computer body 1 at the time of putting of the power supply to work.

At the time of the initialization, CPU 10 reads the status of the connection detection signal through the switch controller 14 based on the processing of S/W. In this case, since the extended I/O device 2 is connected to the computer body 1, the status is rendered active. Based on this information, CPU 10 controls the switch controller 14 so that the signal for permission of access to the I/O controller 13 is rendered nonactive while the signal for permission of access to the I/O controller 22 is rendered active, thereby permitting the I/O controller 22 to respond to access to the I/O controller sent on the system bus 15. I/O controller initialization processing by S/W results in initialization of the I/O controller 22. The above processing permits the computer body 1 to operate the hard disk drive unit 20, the floppy disk drive unit 21, the I/O ports 23A, 23B, and 23C and the like connected to the extended I/O device 2.

According to the above construction, at the time of the connection of the extended I/O device 2 to the computer body 1, copying of register information in the I/O controller 13 provided in the computer body 1 onto the I/O controller 22 provided in the extended I/O device 2 can realize the connection of the extended I/O device 2 to the computer body 1 without relying upon any S/W. Signal lines connected by the connector are only the data line 18B for the access permission signal and the data line 19 for the system bus signal. Thus, the number of signals is reduced. This can reduce the size of the connectors 16, 24 and can improve the connectivity.

Figure 5:
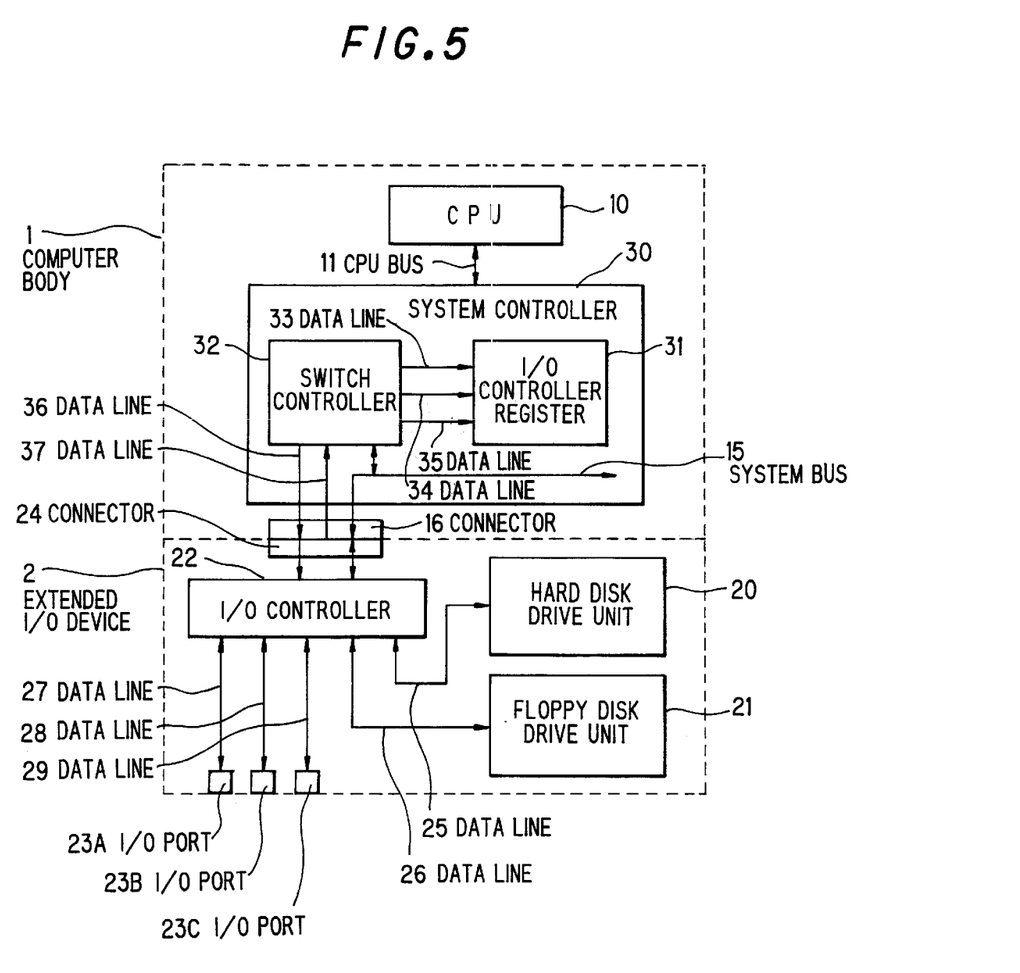
FIG. 5 is a diagram illustrating a second preferred embodiment of the controller for hot swapping of an extended I/O device to a computer body according to the invention.

FIG. 5 shows the controller for hot swapping of an extended I/O device to a computer body according to the second preferred embodiment of the invention. A computer body 1 is provided with a system controller 30 including an I/O controller register 31, a switch controller 32, and a system bus 15. The switch controller 32 is connected to the I/O controller register 31 through data lines 33, 34, and 35. The switch controller 32 is connected to the connector 16 through a data line 35 for permission of access to the I/O controller on the extended I/O device side, a data line 37 for a connection detection signal, and a system bus 15. For the extended I/O device 2, the construction is the same as that of the first preferred embodiment of the invention. Therefore, only a difference between the first and second preferred embodiments of the invention will be explained.

A register portion taken out of the I/O controller described in the first preferred embodiment of the invention is the I/O controller register 31. Functions added to the I/O controller register 31 are such that the I/O controller register 31 receives through a data line 33 through a data line 33 a register selection signal for selecting a predetermined register from a plurality of registers possessed by the I/O controller; receives through a data line 34 a register output permission signal which controls whether or not the contents of the register selected by the register selection signal are output to the data signal in the system bus 15; and further receives through a data line 35 an access permission signal on the computer body side.

The switch controller 32 is the same as the switch controller described in the first preferred embodiment, except that the function of outputting the register selection signal and the register output permission signal has been added. The switch controller 32 outputs through the data line 33 the register selection signal to the I/O controller register 31, and outputs through the data line 34 the register output permission signal. Only the signal from the system bus 15, the signal for permission of access to the extended I/O device side, and the connection detection signal are left from the system controller 30.

Next, the operation of the controller for hot swapping of an extended I/O device to a computer body according to the second preferred embodiment of the invention will be explained.

At the outset, an explanation will be given on the case where, after the computer body 1 is activated in such a state that the computer body 1 is not in connection to the extended I/O device 2, the computer body 1 is connected to the extended I/O device 2.

As soon as the system controller 30 receives initialization data from CPU 10 through a CPU bus 11, the I/O controller register 31 and the switch controller 32 are initialized.

At the time of the initialization, CPU 10 reads the status of a connection detection signal through the switch controller 32 based on the processing of S/W. In this case, since the extended I/O device 2 is not connected to the computer body 1, the status is nonactive. Based on this information, CPU 10 controls the switch controller 32 to render the signal for permission of access to the I/O controller register 31 nonactive to prevent register data from being output from the I/O controller register 31 to the system bus 15. Therefore, the state of the register selection signal is not particularly limited.

Next, upon connection of the connector 16 in the computer body 1 with the connector 24 in the extended I/O device 2, an active connection detection signal is input through the data line 37 into the switch controller 32. Consequently, the switch controller 32 detects the connection between the computer body 1 and the extended I/O device 2. Arbitration within the system controller 30 permits the switch controller 32 to temporarily acquire a right to control the system bus 15. The switch controller 32 controls the register selection signal 33, the register output permission signal 34, and the system bus 15 to copy the whole register information within the I/O controller register 31 onto the I/O controller 22 on the extended I/O device side.

Figure 6:
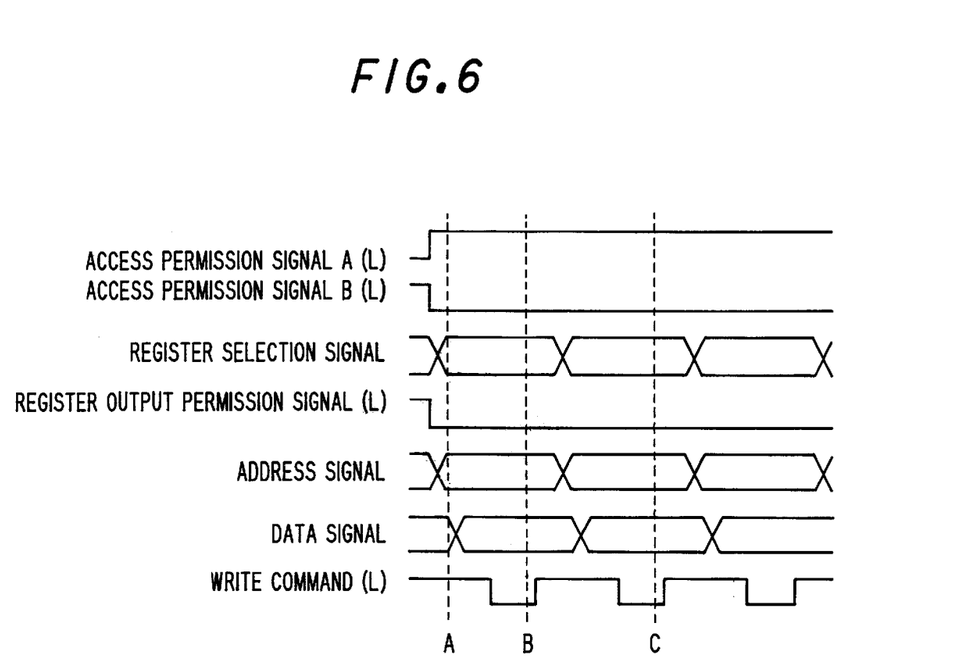
FIG. 6 is a timing chart showing the operation of the second preferred embodiment of the invention.

FIG. 6 shows a timing chart in the second preferred embodiment of the invention. An address signal, a write command, and a data signal are part of signals constituting the system bus 15. In this timing chart, an access permission signal A represents the signal or permission of access to the I/O controller 31, and an access permission signal B represents the signal for permission of access to the I/O controller 22. A symbol (L) attached to the signal name indicates that the signal is active Low, that is, the Low level is active.

In the timing A, the access permission signal A is rendered nonactive, while the access permission signal B is rendered active. Therefore, the I/O controller 22 responds to access on the system bus 15. The switch controller 32 outputs the register selection signal 33 so as to select desired register information. As soon as the register output permission signal 34 is rendered active, the I/O controller register 31 outputs register information, stored in the address, to the data signal.

In the timing B, the write command is rendered active. At that time, since the address signal already outputs the address information of the I/O controller register in which the register information is to be stored, the register information output from the I/O controller register 31 is written in a corresponding address in the I/O controller 22.

The timing C is the same as the timing B, except that the register selection signal, the address signal, and the data signal are switched. The register selection signal and the address signal are controlled by the switch controller 32 according to the next register information. On the other hand, a change in data signal is a change depending upon switching of the register selection signal.

Thus, the timing B or C is repeated in such a manner that, while varying the address signal within a range allocated in the I/O controller, the register selection signal is switched so as to select the register information to be stored in the address, thereby permitting the whole register information in the I/O controller register 31 to be copied onto the I/O controller 22. In this stage, the I/O controller 22 on the extended I/O device side rather than the I/O controller register 31 on the computer body side responds to the access to the I/O controller sent from CPU 10 through the system controller 30 to the system bus 15. S/W recognizes the hard disk drive unit 20, the floppy disk drive unit 21, and the I/O ports 23A, 23B, and 23C as connected to the computer body 1, so that these I/O ports and drive units become usable.

Next, an explanation will be given on the case where a power supply for the computer body 1 is put to work in such a state that the computer body 1 is in connection to the extended I/O device 2.

In this case, the system controller 30, the I/O controller register 31, and the switch controller 32 are initialized in the same manner as described above in connection with the case where the extended I/O device 2 is not in connection with the computer body 1.

At the time of the initialization, CPU 10 reads the status of the connection detection signal through the switch controller 32 based on the processing of S/W. In this case, since the extended I/O device 2 is in connection to the computer body 1, the status is rendered active. Based on this information, CPU 10 controls the switch controller 32 so that the signal A for permission of access to the I/O controller register 31 is rendered nonactive while the signal B for permission of access to the I/O controller 22 is rendered active. Further, the register output permission signal is always rendered nonactive. This permits the I/O controller 22 to respond to access to the I/O controller sent on the system bus 15, I/O controller initialization processing by S/W results in initialization of the I/O controller 22. The above processing permits the computer body 1 to operate the hard disk drive unit 20, the floppy disk drive unit 21, the I/O ports 23A, 23B, and 23C and the like connected to the extended I/O device 2.

According to the above construction, register information is output, based on the register output permission signal, from the register corresponding to the register selection signal output from the switch controller 32 to the data line 19 for the system bus signal. Therefore, in addition to the effect attained by the first preferred embodiment of the invention, shortening of the time taken for the connection of the computer body 1 to the extended 110 device 2 can be achieved by virtue of the fact that reading of the register information from the I/O controller 13 is unnecessary.

As is apparent from the foregoing description, according to the controller for hot swapping of an extended I/O device to computer body, a reduction in the number of signals for the connection of the computer body with the extended I/O device and, in addition, hot swapping of the extended I/O device to the computer body without relying upon any software can be achieved by virtue of the adoption of such a construction that the controller for hot swapping comprises a computer body including a first I/O controller having predetermined data in a set register in a predetermined address; and an extended I/O device which is hot swappable with the computer body and comprises a second I/O controller having a register with an address corresponding to the set register, the controller for hot swapping further comprising control means, the control means for detecting, upon providing power to the computer body, connection of the I/O device to the computer body, and for controlling the initialization of the first and second I/O controllers based on the detection results so that, when the detection results indicate that the extended I/O device is not connected to the computer body, upon providing power to the computer body, the first I/O controller is initialized and, after initialization of the first I/O controller, upon connection of the extended I/O device to the computer body, the control means copies initialization data on the set register in the first I/O controller into the register in the second I/O controller.

The invention has been described in detail with particular reference to preferred embodiments, but it will be understand that variations and modifications can be effected within the scope of the invention as set forth in the appended claims.

What is claimed is:

1. An apparatus comprising:
a computer body including a processing unit and a first I/O (input-output) controller having a first register with a predetermined address, the first register for containing predetermined data;
an extended I/O device which is hot swappable to the computer body and comprises a second I/O controller having a second register, said second register having an address corresponding to the predetermined address of the first register;
means for detecting, upon providing power to the computer body and thereafter, connection of the extended I/O device to the computer body; and
means for controlling initialization of the first and the second I/O controllers such that, when said extended I/O device is connected with the computer body, only one of the first and the second I/O controllers is initialized at any one time based on detection results of said detecting means; and
wherein, when the detection results indicate that the extended I/O device is not connected to the computer body, the first I/O controller is initialized; and, after initialization of the first I/O controller, upon detecting connection of the extended I/O device to the computer body, said controlling means copies initialization data in the first register into the second register.

2. The apparatus according to claim 1, wherein, upon providing power to said computer body, when the detection results indicate that the extended I/O device is connected to the computer body, said controlling means initializes the second register instead of the first register.

3. The apparatus according to claim 1, wherein the address of the second register is identical to the predetermined address of the first register.

4. The apparatus according to claim 1, wherein said controlling means receives a swapping signal from a connector for connecting the extended I/O device to the computer body.

5. The apparatus according to claim 1, wherein said computer body further comprises a system controller.

6. The apparatus according to claim 1, wherein, upon connection of the extended I/O device to the computer body, said controlling means controls the first and second I/O controllers.

7. The apparatus according to claim 1, wherein said extended I/O device further comprises a hard disk drive unit.

8. The apparatus according to claim 1, wherein said extended I/O device further comprises a floppy disk drive unit.

9. The apparatus according to claim 1, wherein the first and the second I/O controllers control at least one of a hard disk drive unit and a floppy disk drive unit.

* * * * *